(12) United States Patent
Sasaki et al.

(10) Patent No.: US 9,089,778 B2
(45) Date of Patent: *Jul. 28, 2015

(54) VIDEO GAME WITH EXPEDITED COMBAT

(71) Applicant: DeNA Co., Ltd., Tokyo (JP)

(72) Inventors: Yu Sasaki, Tokyo (JP); Sadaaki Satsuma, Tokyo (JP); Akihito Suga, Tokyo (JP); Keisuke Kamiyama, Tokyo (JP); Satoshi Kagami, Tokyo (JP); Keisuke Kurita, Tokyo (JP); Junichi Kusumoto, Tokyo (JP); Shinichiro Nonaka, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,932

(22) Filed: Sep. 9, 2014

(65) Prior Publication Data

US 2014/0378197 A1    Dec. 25, 2014

Related U.S. Application Data

(63) Continuation of application No. 14/152,771, filed on Jan. 10, 2014, now Pat. No. 8,858,314.

(30) Foreign Application Priority Data

Apr. 30, 2013   (JP) .................................. 2013-95680

(51) Int. Cl.
*A63F 9/24*   (2006.01)
*A63F 13/00*   (2014.01)
(Continued)

(52) U.S. Cl.
CPC .................. *A63F 13/58* (2014.09); *A63F 13/10* (2013.01); *A63F 13/12* (2013.01); *A63F 13/30* (2014.09); *A63F 13/45* (2014.09); *A63F 13/55* (2014.09); *A63F 13/69* (2014.09); *A63F 13/822* (2014.09)

(58) Field of Classification Search
CPC ......... A63F 13/45; A63F 13/55; A63F 13/58; A63F 13/822
See application file for complete search history.

(56) References Cited

U.S. PATENT DOCUMENTS 7,223,174 B2   5/2007   Machida
8,012,007 B2   9/2011   Yoshida
(Continued)

FOREIGN PATENT DOCUMENTS

JP   2007-061253   3/2007

*Primary Examiner* — Lawrence Galka
(74) *Attorney, Agent, or Firm* — Procopio, Cory, Hargreaves & Savitch LLP

(57) ABSTRACT

A server device executes one battle by spending the spending parameter in response to a player's operational input, and recovers the spending parameter by using a recovery item owned by the player. The server device calculates the total number of recovery items used to recover the spending parameter when one battle is fought for a plurality of times while repeating spending and recovering the spending parameter in response to operational inputs from the player until a hit point parameter of the enemy character is brought to less than or equal to a value. In response to one special operational input from the player, the server device determines whether the number of recovery items owned by the player is greater than or equal to the total number of recovery items calculated. When the determination is affirmative, the total number of recovery items calculated is automatically used from among the recovery items.

2 Claims, 16 Drawing Sheets

(51) Int. Cl.
- *A63F 13/58* (2014.01)
- *A63F 13/30* (2014.01)
- *A63F 13/45* (2014.01)
- *A63F 13/55* (2014.01)
- *A63F 13/40* (2014.01)
- *A63F 13/822* (2014.01)
- *A63F 13/69* (2014.01)

(56) References Cited

U.S. PATENT DOCUMENTS

| | | |
|---|---|---|
| 2002/0128070 A1 | 9/2002 | Miyamoto et al. |
| 2004/0229669 A1 | 11/2004 | Zimmerman |
| 2010/0069159 A1 | 3/2010 | Yamada et al. |
| 2012/0190444 A1 | 7/2012 | Fujisawa et al. |
| 2013/0217489 A1 | 8/2013 | Bronstein Bendayan et al. |

FIG. 4

| CARD ID | CHARACTER NAME | LEVEL | ATTACK STRENGTH | DEFENSE STRENGTH | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

FIG. 5

| RECOVERY ITEM ID | RECOVERY ITEM NAME | PRICE | RECOVERY VALUE |
|---|---|---|---|
| 1 | RECOVERY ITEM A | 30 | 1 |
| 2 | RECOVERY ITEM B | 40 | 2 |
| 3 | RECOVERY ITEM C | 50 | 3 |

FIG. 6

| PLAYER ID | FRIEND PLAYER ID | VIRTUAL CURRENCY | SPENDING PARAMETER | OWNED CARD INFORMATION | OWNED RECOVERY ITEM INFORMATION |
|---|---|---|---|---|---|
| 1 | 5, 8 | 0 | 3 | OWNED CARD INFORMATION (1) | OWNED RECOVERY ITEM INFORMATION (1) |
| 2 | NONE | 500 | 2 | OWNED CARD INFORMATION (2) | OWNED RECOVERY ITEM INFORMATION (2) |
| 3 | 4, 6 | 700 | 1 | OWNED CARD INFORMATION (3) | OWNED RECOVERY ITEM INFORMATION (3) |
| 4 | 3, 6 | 1000 | 3 | OWNED CARD INFORMATION (4) | OWNED RECOVERY ITEM INFORMATION (4) |
| 5 | 1, 6 | 100 | 2 | OWNED CARD INFORMATION (5) | OWNED RECOVERY ITEM INFORMATION (5) |
| 6 | 3, 4, 5 | 3000 | 1 | OWNED CARD INFORMATION (6) | OWNED RECOVERY ITEM INFORMATION (6) |
| . | . | . | . | . | . |
| . | . | . | . | . | . |
| . | . | . | . | . | . |

FIG. 7

OWNED CARD INFORMATION (3)

OWNED CARD INFORMATION (2)

OWNED CARD INFORMATION (1)

| OWNED CARD ID | LEVEL | ATTACK STRENGTH | DEFENSE STRENGTH | HIT POINT | ACQUIRED DATE AND TIME |
|---|---|---|---|---|---|
| 0011 | LV.3 | 15 | 10 | 200 | 2012/2/13 10:00 |
| 0211 | LV.4 | 20 | 23 | 150 | 2012/2/13 12:00 |
| 0133 | LV.1 | 70 | 45 | 100 | 2012/2/14 11:30 |
| 0201 | LV.4 | 22 | 40 | 600 | 2012/2/15 18:00 |
| 0072 | LV.7 | 60 | 50 | 250 | 2012/2/16 13:30 |
| 0094 | LV.1 | 300 | 200 | 450 | 2012/2/16 19:00 |
| ... | ... | ... | ... | ... | ... |

FIG. 8

| OWNED RECOVERY ITEM INFORMATION (1) ||
|---|---|
| RECOVERY ITEM ID | NUMBER OF ITEMS OWNED |
| 1 | 20 |
| 2 | – |
| 3 | 1 |

OWNED RECOVERY ITEM INFORMATION (2)
OWNED RECOVERY ITEM INFORMATION (3)

FIG. 9

| ENEMY CHARACTER ID | ENEMY CHARACTER NAME | LEVEL | ATTACK STRENGTH | DEFENSE STRENGTH | HIT POINT (HP) | APPEARANCE TIME |
|---|---|---|---|---|---|---|
| 001 | BOSS A | 15 | 5000 | 4500 | 10000 | 60 MINUTES |
| ⋮ | ⋮ | ⋮ | ⋮ | ⋮ | ⋮ | ⋮ |

VIDEO GAME WITH EXPEDITED COMBAT

CROSS-REFERENCE TO RELATED APPLICATIONS

This application claims the benefit of domestic priority under 35 USC 120 to U.S. patent application Ser. No. 14/152,771, filed on Jan. 10, 2014, as well as the benefit of foreign priority under 35 USC 119 to Japanese Patent Application No. 2013-95680, filed on Apr. 30, 2013; further, Japanese Patent Application No. 2013-144645 is a Divisional application of Japanese Patent Application No. 2013-95680. The contents of the foregoing are incorporated herein by reference in their entirety.

BACKGROUND OF THE INVENTION

1. Field of the Invention

The present invention relates to a server device and a game program.

2. Description of the Related Art

There has been known a game program by which a computer executes a battle game of accepting an operational input by a player, battling an enemy character to be an opponent on the basis of the operational input, and then determining win/loss of the battle (refer to Japanese Patent Application Laid-Open No. 2007-61253, for example).

SUMMARY OF THE INVENTION

In such game program, a spending parameter set to a player is spent in battling an enemy character. The player needs to recover the spending parameter before fighting a battle when the spending parameter is running short. There has been a case, in such circumstance, where the battle against the enemy character takes a long time due to the time required to recover the spending parameter.

The present invention has been made in consideration of such circumstances. An object of the present invention is to shorten a battle time against the enemy character by recovering the spending parameter without taking time.

The main aspect of the present invention that solves the aforementioned problem is a server device which is connected to a player terminal used by a player through a network and executes a battle game in which a player character fights a battle against an enemy character, the server device including: a storage unit which stores player information, player character information including an attack strength parameter indicating an attack strength of the player character, and enemy character information including a hit point parameter indicating a hit point of the enemy character, the player information setting, to the player, a spending parameter spent every time one battle is fought as well as the number of recovery items owned that is used to recover the spending parameter; a battle processing unit which changes the hit point parameter of the enemy character on the basis of the attack strength parameter of the player character by executing one battle while spending the spending parameter set to the player in response to an operational input from the player, and recovers the spent spending parameter by using the recovery item owned by the player in response to an operational input from the player, when the spending parameter is spent in one battle; a calculation unit which calculates a total number of the recovery items used to recover the spending parameter when one battle is fought for a plurality of times while repeating spending and recovering of the spending parameter in response to a plurality of operational inputs from the player until the hit point parameter of the enemy character is brought to less than or equal to a predetermined value by the battle processing unit; a determination unit which determines whether or not the number of recovery items owned by the player is greater than or equal to the total number of the recovery items calculated by the calculation unit, in response to a special operational input from the player; and a special battle processing unit which automatically uses the total number of the recovery items calculated by the calculation unit from among the recovery items owned by the player and brings the hit point parameter of the enemy character to less than or equal to the predetermined value by fighting one battle not for the plurality of times but only once, when the determination made by the determination unit is affirmative.

Other characteristics of the present invention will become clear from the description of the present specification and the appended drawings.

According to the present invention, the battle time against the enemy character can be shortened by recovering the spending parameter without taking time.

BRIEF DESCRIPTION OF THE DRAWINGS

FIG. 4 is a diagram illustrating an example of a data structure of card information;

FIG. 5 is a diagram illustrating an example of a data structure of recovery item information;

FIG. 6 is a diagram illustrating an example of a data structure of player information;

FIG. 7 is a diagram illustrating an example of a data structure of owned card information;

FIG. 8 is a diagram illustrating an example of a data structure of an owned recovery item;

FIG. 9 is a diagram illustrating an example of a data structure of enemy character information;

DETAILED DESCRIPTION OF THE INVENTION

Figure 1:
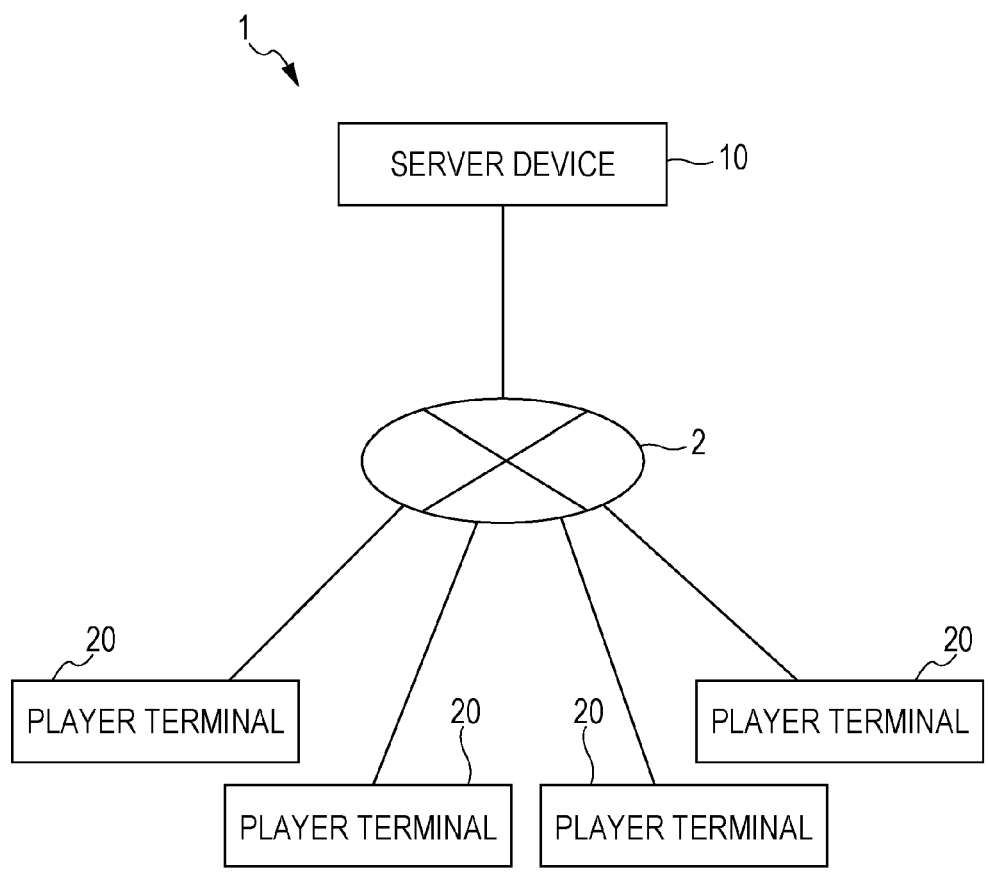
FIG. 1 is a diagram illustrating an overall configuration example of a game system.

At least the following matters will become clear according to the description of the present specification and the appended drawings.

That is, there is provided a server device which is connected to a player terminal used by a player through a network and executes a battle game in which a player character fights a battle against an enemy character, the server device including: a storage unit which stores player information, player character information including an attack strength parameter indicating an attack strength of the player character, and enemy character information including a hit point parameter indicating a hit point of the enemy character, the player information setting, to the player, a spending parameter spent every time one battle is fought as well as the number of recovery items owned that is used to recover the spending parameter; a battle processing unit which changes the hit point parameter of the enemy character on the basis of the attack strength parameter of the player character by executing one battle while spending the spending parameter set to the player in response to an operational input from the player, and recovers the spent spending parameter by using the recovery item owned by the player in response to an operational input from the player, when the spending parameter is spent in one battle; a calculation unit which calculates a total number of the recovery items used to recover the spending parameter when one battle is fought for a plurality of times while repeating spending and recovering of the spending parameter in response to a plurality of operational inputs from the player until the hit point parameter of the enemy character is brought to less than or equal to a predetermined value by the battle processing unit; a determination unit which determines whether or not the number of recovery items owned by the player is greater than or equal to the total number of the recovery items calculated by the calculation unit, in response to a special operational input from the player; and a special battle processing unit which automatically uses the total number of the recovery items calculated by the calculation unit from among the recovery items owned by the player and brings the hit point parameter of the enemy character to less than or equal to the predetermined value by fighting one battle not for the plurality of times but only once, when the determination made by the determination unit is affirmative.

Such server device can shorten a battle time against the enemy character by recovering the spending parameter without taking time.

Such server device may also include a screen data generation unit which generates screen data used to display, on the player terminal, a game screen from which the player purchases the recovery item in shortage when the determination made by the determination unit is negated.

The player can easily purchase the recovery item in shortage according to such server device.

Moreover, such server device may be provided such that: an amount of virtual currency owned that is used within a game is set to the player in the player information; and the special battle processing unit brings the number of the recovery items owned by the player to more than or equal to the total number of the recovery items calculated by the calculation unit by automatically spending the amount of virtual currency corresponding to the value of the recovery item in shortage, when the determination made by the determination unit is negated.

The player can automatically purchase the recovery item in shortage according to such server device.

Furthermore, such server device may be provided such that the special battle processing unit automatically uses the total number of the recovery items calculated by the calculation unit from among the recovery items owned by the player and brings the hit point parameter of the enemy character to less than or equal to the predetermined value by fighting one battle not for the plurality of times but only once, when having made the number of the recovery items owned by the player greater than or equal to the total number of the recovery items calculated by the calculation unit by automatically spending the virtual currency.

Such server device can shorten the battle time against the enemy character by recovering the spending parameter without taking time even when the recovery item owned by the player is in shortage.

Furthermore, such server device may be provided such that: the server device is connected to the player terminal used by each of a plurality of players through the network; the enemy character is set to be able to battle the player character of each of the plurality of players; and the server device includes a rewarding unit which selects, from the plurality of players, a player who has brought the hit point parameter of the enemy character to less than or equal to the predetermined value on the basis of a change in the hit point parameter of the enemy character and gives a reward to the player.

According to such server device, one can enjoy the battle game while competing with another player to earn a reward.

Embodiments

Configuration of Game System 1

FIG. 1 is a diagram illustrating an example of an overall configuration of a game system 1 according to the present embodiment. The game system 1 provides a player with various services related to a game through a network 2 (for example, the Internet and the like), and includes a server device 10 and a plurality of player terminals 20.

<<Configuration of Server Device 10>>

Figure 2:
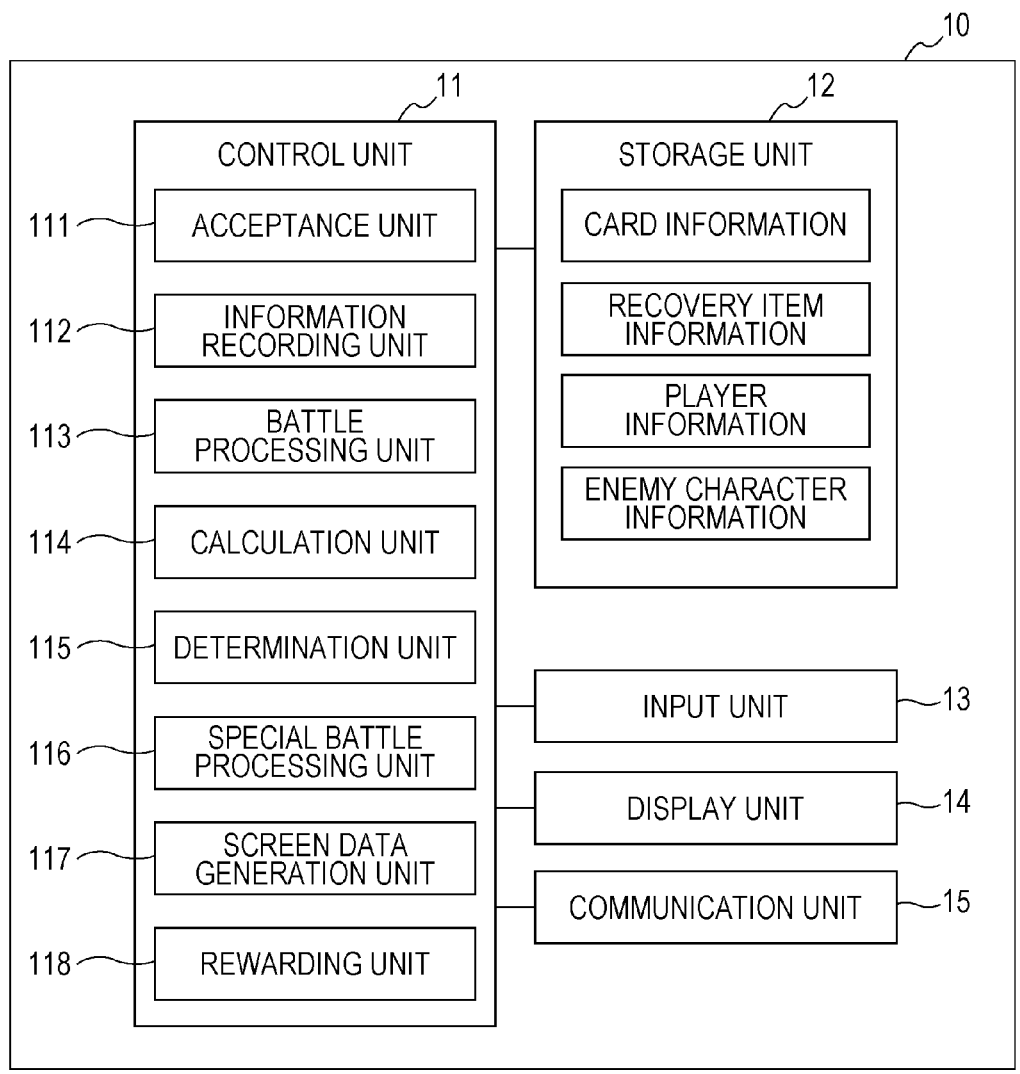
FIG. 2 is a block diagram illustrating a functional configuration of a server device.

FIG. 2 is a block diagram illustrating a functional configuration of the server device 10 according to the present embodiment. The server device 10 is an information processing device (for example, a workstation, a personal computer, and the like) used when a system administrator and the like manage the game service. The server device 10 can distribute a game program operable on the player terminal 20, and a web page (game screen, and the like) made in a markup language (HTML, and the like) according to a specification of the player terminal 20 upon receiving various commands (requests) from the player terminal 20. The server device 10 includes a control unit 11, a storage unit 12, an input unit 13, a display unit 14, and a communication unit 15.

The control unit 11 performs data passing among units as well as controlling the entire server device 10, and is realized by a central processing unit (CPU) executing a program stored in a predetermined memory. The control unit 11 of the present embodiment includes an acceptance unit 111, an information recording unit 112, a battle processing unit 113, a calculation unit 114, a determination unit 115, a special battle processing unit 116, a screen data generation unit 117, and a rewarding unit 118.

The acceptance unit 111 includes a function to execute a process of accepting an operational input by a player. Specifically, the acceptance unit 111 can accept the operational input by the player when the server device 10 receives, through a network, operation information (a command and the like) input by the player by using the player terminal 20.

The information recording unit 112 is connected to the storage unit 12 through a bus and includes a function to execute a process of recording various data into the storage unit 12 in accordance with a command from the control unit 11. The information recording unit 112 of the present embodiment records into the storage unit 12 a spending parameter, player information, player character information, enemy character information and the like.

The battle processing unit 113 includes a function to perform a battle process in response to an operational input (a normal attack) from the player. In response to the operational input from the player, the battle processing unit 113 of the present embodiment executes one battle by spending the spending parameter set to the player and changes a hit point parameter of an enemy character. The battle processing unit 113 also recovers the spent spending parameter by using a recovery item owned by the player in response to the operational input from the player, when the spending parameter is spent in one battle.

The calculation unit 114 includes a function to execute a process of calculating a reference value used by the determination unit 115 on the basis of various operation information (an operation to perform a normal attack by spending the spending parameter and an operation to use the recovery item) that is to be input until the hit point parameter of the enemy character is brought to less than or equal to a predetermined value. The calculation unit 114 of the present embodiment calculates a total number of the recovery items used to recover the spending parameter when the battle processing unit 113 executes one battle for a plurality of times by repeating spending and recovering of the spending parameter in response to a plurality of operational inputs from the player until the hit point parameter of the enemy character is brought to less than or equal to the predetermined value.

The determination unit 115 includes a function to execute various determination processes. The determination unit 115 of the present embodiment determines whether or not the number of recovery items owned by the player is greater than or equal to the total number of the recovery items calculated by the calculation unit 114 when one special operational input is performed by the player.

The special battle processing unit 116 includes a function to execute a special battle process in response to a special operational input (a special attack) from the player. The special battle processing unit 116 of the present embodiment automatically uses the total number of the recovery items calculated by the calculation unit 114 from among the recovery items owned by the player and brings the hit point parameter of the enemy character to less than or equal to the predetermined value by executing one battle not for a plurality of times but only once, when the determination made by the determination unit 115 is affirmative.

The screen data generation unit 117 includes a function to execute a process of generating screen data for displaying, in the player terminal 20, a game screen for allowing the player to play a game. The screen data generation unit 117 of the present embodiment generates HTML data as the screen data corresponding to the game screen.

The rewarding unit 118 includes a function to execute a process of giving a reward to a player who satisfies a predetermined grant condition in battling the enemy character. The rewarding unit 118 of the present embodiment gives a reward to a player who has brought the hit point parameter of the enemy character to less than or equal to the predetermined value.

The storage unit 12 includes a read only memory (ROM) that is a read only storage area in which a system program is stored, and a random access memory (RAM) that is a rewritable storage area used as a work area for arithmetic processing by the control unit 11. The storage unit 12 is, for example, realized by a non-volatile storage device, such as a flash memory or a hard disk. The storage unit 12 of the present embodiment stores at least card information pertaining to a game card as an example of a game content, recovery item information pertaining to the recovery item, the player information pertaining to the player, and the enemy character information pertaining to the enemy character. Note that each of the information will be described in detail.

The input unit 13 is used by the system administrator and the like for inputting various data (for example, the card information and the like), and is realized by, for example, a keyboard, a mouse, and the like.

The display unit 14 is used for displaying an operation screen for the system administrator based on a command from the control unit 11, and is, for example, realized by a liquid crystal display (LCD) and the like.

The communication unit 15 is used for performing communication with the player terminal 20, and has a function as a reception unit that receives various data and signals transmitted from the player terminal 20, and a function as a transmission unit that transmits various data and signals to the player terminal 20 according to a command of the control unit 11. The communication unit 15 is, for example, realized by a network interface card (NIC), and the like.

<<Configuration of Player Terminal 20>>

Figure 3:
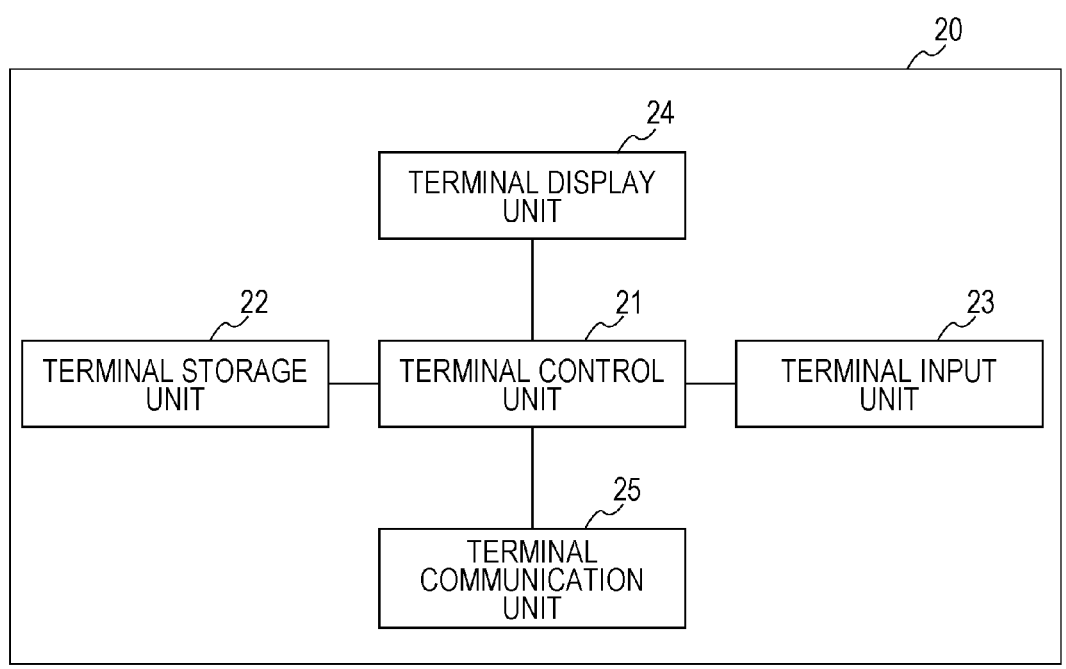
FIG. 3 is a block diagram illustrating a functional configuration of a player terminal.

FIG. 3 is a block diagram illustrating a functional configuration of the player terminal 20. The player terminal 20 of the present embodiment is an information processing device (for example, a mobile phone terminal, a smart phone, and the like) used by the player when playing a game, and can request distribution of various types of information (a game program, a web page, and the like) related to the game to the server device 10. Since the player terminal 20 has a web browser function for allowing the player to browse a web page, the web page (a game screen, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a program stored in a predetermined memory. Note that the terminal control unit 21 of the present embodiment also functions as a screen display control unit that controls a display form of the game screen displayed in the terminal display unit 24. The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, and the like. The terminal input unit 23 is used for performing various operations (a game operation, and the like) by the player, and is realized, for example, by an operation button, a touch panel, and the like. The terminal display unit 24 is provided to display the game screen (such as a game image and an operation image) by a command from the terminal control unit 21, and is realized by a liquid crystal display (LCD) or the like, for example. The terminal communication unit 25 functions as a transmission/reception unit for performing transmission/reception of various types of information with the server device 10 through the network 2, and is realized, for example, by a network interface card (NIC), and the like.

<<Data Structure>>

FIG. 4 is a diagram illustrating an example of a data structure of the card information stored in the storage unit 12 of the server device 10. The card information includes an item (a field) such as a card ID, a character name, a level, an attack strength, a defense strength, and a hit point. The card ID is a piece of identification information which identifies a game card as an example of a game content. The game content can be, for example, the game card or a figure to which a character or the like is associated, or an item such as a tool/ability that can be used within a game. In the present embodiment, the game card as an example of the game content is used within a virtual space of a game. The character name is a piece of information indicating a display name of the character associated with the game card. Each of the level, attack strength, defense strength, hit point and the like of the character is a parameter indicating a performance value initially set to the character.

FIG. 5 is a diagram illustrating an example of a data structure of the recovery item information stored in the storage unit 12 of the server device 10. The recovery item information includes an item (a field) such as a recovery item ID, a recovery item name, a price, and a recovery value. The recovery item ID is a piece of identification information that identifies the recovery item. The recovery item name is a piece of information indicating a display name of the recovery item. The price is a piece of information indicating the value of the recovery item. The recovery value is a piece of information indicating a recovery amount of the spending parameter.

FIG. 6 is a diagram illustrating an example of a data structure of the player information stored in the storage unit 12 of the server device 10. The player information includes an item such as a player ID, a friend player ID, virtual currency, the spending parameter, owned card information, and owned recovery item information. The player ID is identification information that identifies the player. The friend player ID is identification information that identifies other players registered in a friend list of the player. That is, the larger the number of the friend player IDs registered, the more other players had become friends with the player. The virtual currency is an example of the game value and is information indicating an amount of virtual currency possessed by the player. The player can purchase and possess the virtual currency. The spending parameter is a parameter spent by fighting a battle against the enemy character. The player in the present embodiment can fight a battle against the enemy character by spending the spending parameter (decreasing the value of the spending parameter). In other words, the present embodiment is set such that the player cannot fight a battle against the enemy character when the spending parameter is running short. The owned card information is a piece of information indicating the game card (hereinafter also referred to as an owned card) owned by the player. The owned recovery item information is a piece of information indicating the recovery item (hereinafter also referred to as an owned recovery item) owned by the player.

FIG. 7 is a diagram illustrating an example of a data structure of the owned card information. The owned card information includes an item such as an owned card ID as well as a level, the attack strength, the defense strength, the hit point, and an acquired date and time of an owned card. The owned card ID is a piece of identification information identifying the owned card. Each of the level, the attack strength, the defense strength, and the hit point of the owned card is a parameter indicating a performance value set to a character corresponding to the owned card. These various parameters are updated according to a result of a battle game, and the like. The acquired date and time is a piece of information indicating a date and time when the player acquires the owned card.

FIG. 8 is a diagram illustrating an example of a data structure of the owned recovery item information. The owned recovery item information includes an item such as the recovery item ID and the number of items owned. The recovery item ID is a piece of identification information identifying various recovery items owned by the player. The number of items owned is a piece of information indicating a quantity of the recovery item owned by the player.

FIG. 9 is a diagram illustrating an example of a data structure of the enemy character information stored in the storage unit 12 of the server device 10. The enemy character information includes an item such as an enemy character ID, an enemy character name, the level, the attack strength, the defense strength, the hit point (HP), and an appearance time. The enemy character ID is a piece of identification information identifying the enemy character. The enemy character name is a piece of information indicating a display name of the enemy character. Each of the level, the attack strength, the defense strength, and the hit point (HP) of the enemy character is a parameter indicating a performance value set to the enemy character. These various parameters are updated according to a result of a battle game, and the like. The appearance time is a piece of information indicating a duration for which the enemy character appears. In other words, the appearance time corresponds to the time during which the player can battle against the enemy character, whereby the battle against the enemy character is limited within the appearance time.

<<Outline of Game>>

Here, an outline of a game provided by the game system 1 of the present embodiment will be described. The game system 1 provides a battle game played by using the game card (a virtual card used in the virtual space of the game) to which a game character is associated.

<Battle Game>

In the game system 1 according to the present embodiment, the player can own a plurality of game cards (characters). The player selects a game card (a player character) to be used in the battle game from among the plurality of game cards owned by the player himself. The control unit 11 determines the enemy character to be the opponent of the player character selected by the player, and determines win/loss of the battle game between these characters on the basis of the various parameters (such as the level, the attack strength, the defense strength, and the hit point) set to each character.

The player plays the battle game by spending the spending parameter set to the player. The player cannot play the battle game when the spending parameter is running short. In such case, the player can recover the spending parameter by using the recovery item owned by the player himself. Note that the spending parameter can be recovered as time elapses without using the recovery item.

<Relationship Between Normal Attack and Special Attack>

In the battle game of the present embodiment, the player can perform not only the normal attack but the special attack. The relationship between the normal attack and the special attack will be specifically described below.

Figure 10:
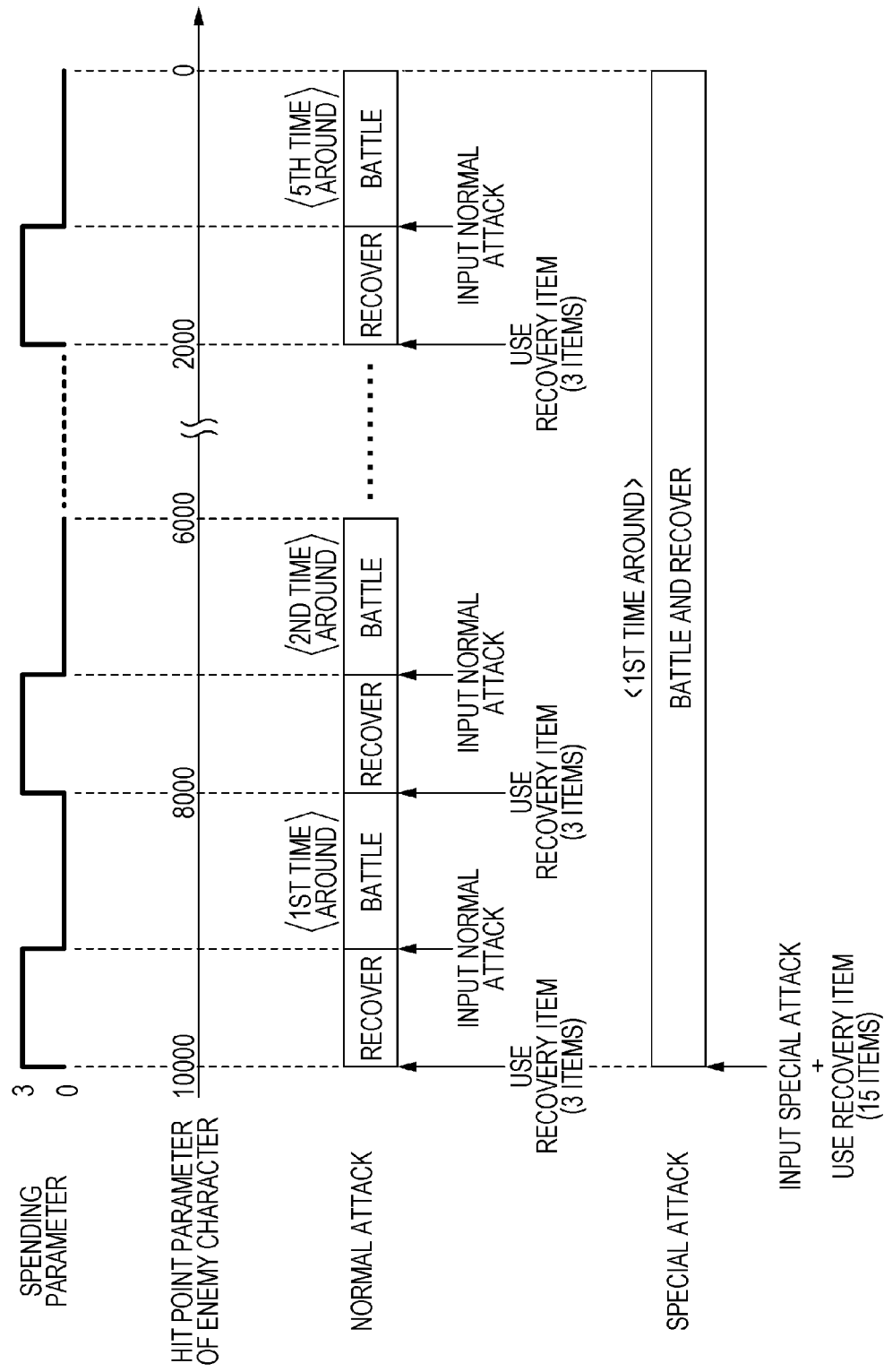
FIG. 10 is a diagram illustrating the relationship between a normal attack and a special attack.

FIG. 10 is a diagram illustrating the relationship between the normal attack and the special attack when the hit point parameter of the enemy character is to be brought to less than or equal to the predetermined value. Described here is an example where the hit point parameter of the enemy character is to be brought to equal to "0". Note that the hit point parameter of the enemy character at the time the enemy character appears is assumed to be "10000", while the spending parameter set to the player is assumed to be zero point. Moreover, the maximum points (three points) of the spending parameter are assumed to be spent in one battle where, after the spending parameter is spent, the maximum points (three points) can be recovered by using three recovery items each used to recover one point in the spending parameter.

The normal attack will be described first. The player cannot play the battle game at the time the enemy character appears because the spending parameter equals zero point (the spending parameter is running short). The player is thus required to recover the spending parameter. Here, the spending parameter is recovered by three points when the player uses three of the recovery items.

The spending parameter is spent by three points once the player performs the operational input for the normal attack after recovery, whereby one battle is fought while the player character attacks and does damage equal to "2000" to the enemy character (a first time around). As a result, the hit point parameter of the enemy character is decreased to "8000", while the spending parameter set to the player goes back to zero point. After the battle is over for the first time around, the player is required to recover the spending parameter again in order to continue the battle against the enemy character because the spending parameter equals zero point (the spending parameter is running short). Here, the spending parameter is recovered by three points when the player uses three of the recovery items.

The spending parameter is spent by three points once the player performs the operational input for the normal attack after recovery, whereby one battle is fought while the player character attacks and does damage equal to "2000" to the enemy character (a second time around). As a result, the hit point parameter of the enemy character is decreased to "6000", while the spending parameter set to the player goes back to zero point. After one battle is fought for a plurality of times by repeating spending and recovering of the spending parameter, the hit point parameter of the enemy character becomes "0" when the battle is over for a fifth time around.

In the normal attack, as described above, one battle is fought for a plurality of times while repeating spending and recovering of the spending parameter by the plurality of operational inputs performed by the player until the hit point parameter of the enemy character is brought to equal to "0". That is, the player is required to recover the spending parameter every time one battle is fought, thereby taking time in recovering the spending parameter.

The special attack will now be described. When the player performs an operational input for the special attack once, 15 recovery items are automatically used (the spending parameter is automatically spent by 15 points) so that one battle is fought not for a plurality of times but only once because the player character attacks and does damage equal to "10000" to the enemy character (a first time around). As a result, the hit point parameter of the enemy character is brought to "0" in one go. That is, the total number of recovery items used until the hit point parameter of the enemy character becomes "0" is calculated in advance assuming the normal attack is performed. Then, the recovery items equal to the total number calculated are used at the start of the special attack. As described above, three recovery items are used five times until the hit point parameter of the enemy character becomes "0" in the normal attack, whereby the total number of recovery items used in recovering the spending parameter equals 15 items. Accordingly, the 15 recovery items are automatically used at the start of the special attack.

As described above, the hit point parameter of the enemy character can be brought to equal to "0" in one battle in the special attack where the player performs the operational input for the special attack only once. Compared to the normal attack, the spending parameter can thus be recovered without taking time and, at the same time, the battle time against the enemy character can be shortened.

<Rewarding>

The battle game of the present embodiment is a battle game with multi-player participation in which a plurality of players participate. The enemy character is set as an opponent common to each player. Each player thus fights a battle against the common enemy character individually. In the present embodiment, a reward is given to a player who contributes to the winning of the battle game with multi-player participation, the player being the one who has brought the hit point parameter of the enemy character to less than or equal to the predetermined value (namely, the player who has put an end to the enemy character), for example.

The rewarding unit 118 of the server device 10 according to the present embodiment selects the player who has brought the hit point parameter of the enemy character to "0" from among the plurality of participating players, on the basis of the change in the hit point parameter of the enemy character, and then gives the reward to the player. Each player can therefore enjoy the battle game while competing with another player to acquire the reward.

Each player can perform not only the normal attack but the special attack in the battle game with multi-player participation as well. Accordingly, in the special attack, the spending parameter can be recovered without taking time as compared to the normal attack and, at the same time, the battle time against the enemy character can be shortened, thereby allowing the player to bring the hit point parameter of the enemy character to "0" before the other player does.

Operation of Game System 1

Operation Example 1

Figure 11:
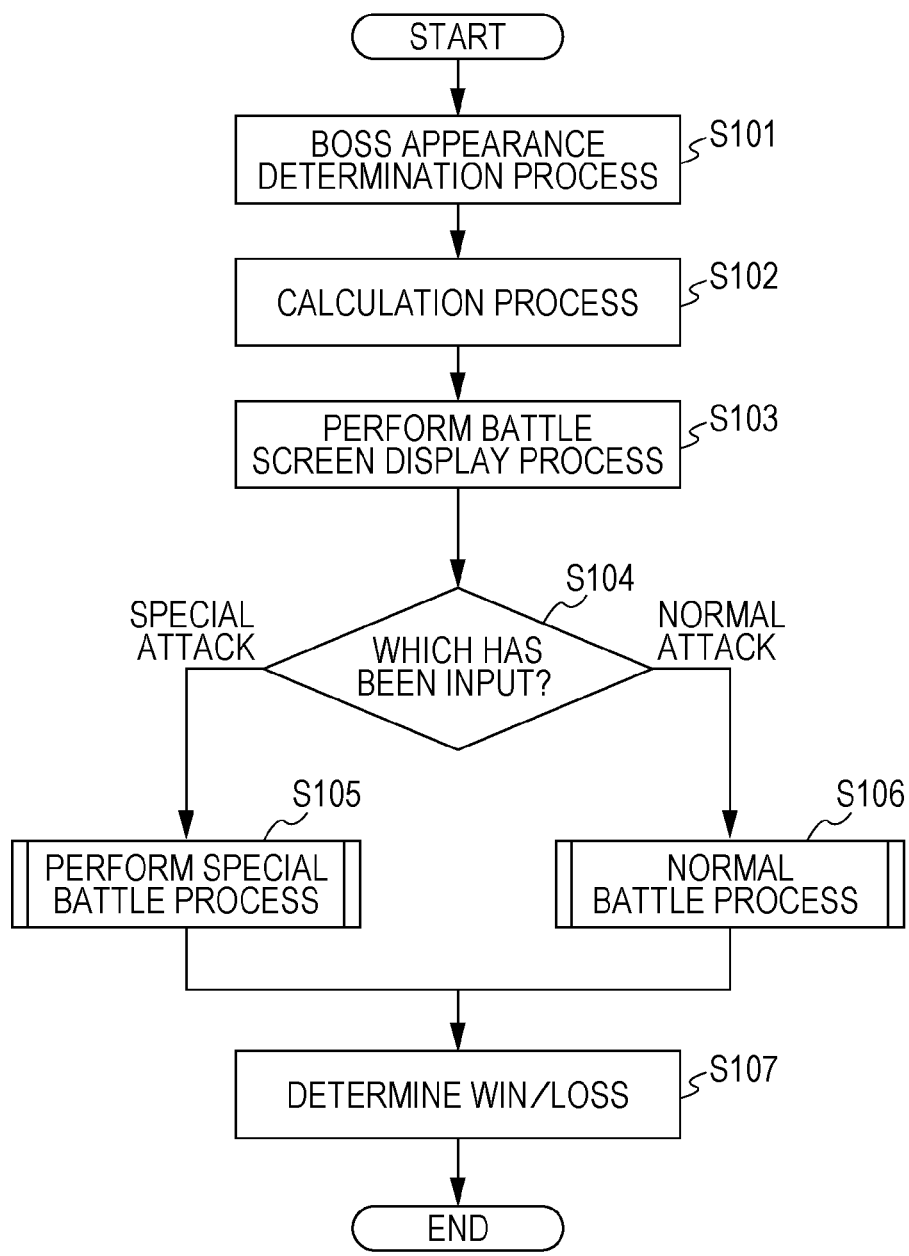
FIG. 11 is a flowchart illustrating an operation example of the game system.

FIG. 11 is a flowchart illustrating an operation example of the game system 1 according to the present embodiment.

Upon receiving an operational input by the player from the terminal input unit 23, the terminal control unit 21 of the player terminal 20 transmits a command (a start game request) to start the battle game to the server device 10 through the terminal communication unit 25.

The server device 10 having received the start game request from the player terminal 20 then performs an appearance determination process of determining whether or not to let the enemy character to be opponent appear (S101). When it is determined to let the enemy character appear, the control unit 11 refers to the enemy character information illustrated in FIG. 9 and selects the enemy character to be the opponent from among the plurality of enemy characters.

Next, the calculation unit 114 of the server device 10 assumes the normal attack is performed and performs a calculation process of calculating the total number of recovery items used until the hit point parameter of the enemy character is brought to less than or equal to the predetermined value (S102). The calculation unit 114 of the present embodiment calculates, on the basis of the hit point parameter of the enemy character at the time of appearance and the attack strength parameter of the player character, the number of single battles to be fought until the hit point parameter of the enemy character becomes "0", and then calculates the total number of recovery items by multiplying the number of battles by the number of recovery items (pieces/battle). In the normal attack where the hit point parameter of the enemy character at the time of appearance is "10000" as illustrated in FIG. 10 and the attack strength parameter of the player character is "400", for example, the damage done to the enemy character by the player character equals "2000" ("400"×5 times) because the attack strength of the player character increases fivefold when the player character performs the normal attack by spending the recovered spending parameter by three points (refer to FIG. 12). Accordingly, the hit point parameter of the enemy character decreases from "10000" to "8000" when one battle is fought by the normal attack. This means that five battles are to be fought in order to decrease the hit point parameter of the enemy character from "10000" to "0". Therefore, the total number of recovery items equals 15 which is calculated by multiplying the number of battles (5 times) by the number of recovery items (3 pieces/1 battle).

Next, the screen data generation unit 117 of the server device 10 generates screen data (an HTML file) which is used to display, on the player terminal 20, a game screen (a web page) provided for the player to perform the operational input. The server device 10 transmits the screen data (HTML file) of a game screen (web page) generated in this way to the player terminal 20 as a requestor through the network.

Next, the player terminal 20 displays the game screen corresponding to the screen data in the terminal display unit 24 by analyzing the screen data upon receiving the screen data (HTML data) transmitted from the server device 10 (S103).

Figure 12:
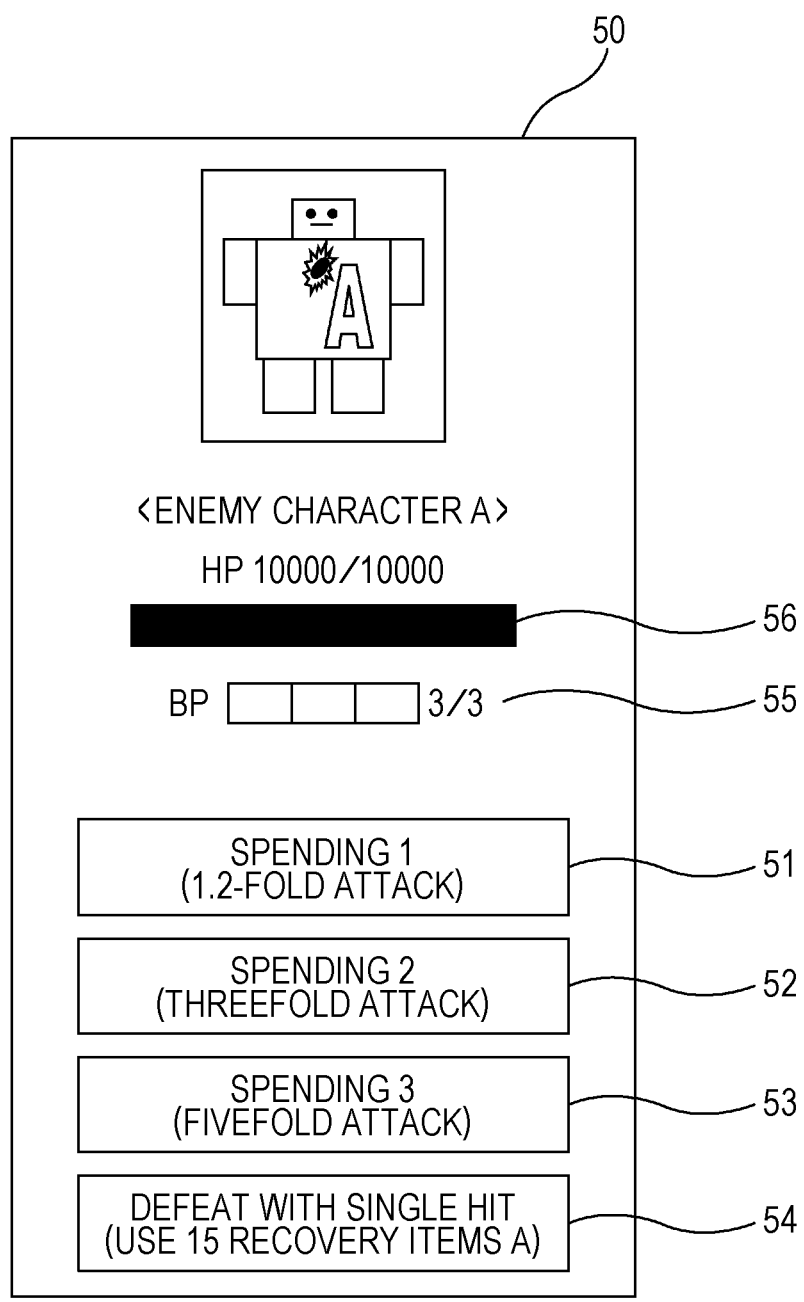
FIG. 12 is a diagram illustrating an example of a game screen on which an operational input for each of the normal attack and the special attack is performed.

FIG. 12 is a diagram illustrating an example of the game screen used to perform the operational input for the normal attack and the special attack. A game screen 50 includes operation buttons 51, 52, and 53 used to perform the normal attack, an operation button 54 used to perform the special attack, a spending parameter display area 55, and a hit point parameter display area 56. The operation buttons 51, 52, and 53 are used to perform the normal attack by spending the spending parameter by 1, 2, and 3 points, respectively. The attack strength of the player character increases 1.2-fold, threefold, and fivefold when each of the operation buttons 51, 52, and 53 is selected by the player, respectively. The operation button 54 is used to perform the special attack. When the operation button 54 is selected by the player, the 15 recovery items are automatically used as well as the hit point parameter of the enemy character becomes "0" in one go. That is, the enemy character can be defeated with a single hit.

Referring back to FIG. 11, operation information is transmitted from the player terminal 20 to the server device 10 when the player has selected and input the operation information related to the battle in the aforementioned manner.

Next, the server device 10 performs a determination process on the basis of the operation information received from the player terminal 20 (S104). Specifically, the determination unit 115 determines whether the player has selected the operation buttons 51, 52, and 53 for the normal attack or the operation button 54 for the special attack. The special battle process is executed when the operation button 54 to perform the special attack has been selected (S105), whereas the normal battle process is executed when the operation buttons 51, 52, and 53 to perform the normal attack have been selected (S106).

Figure 13:
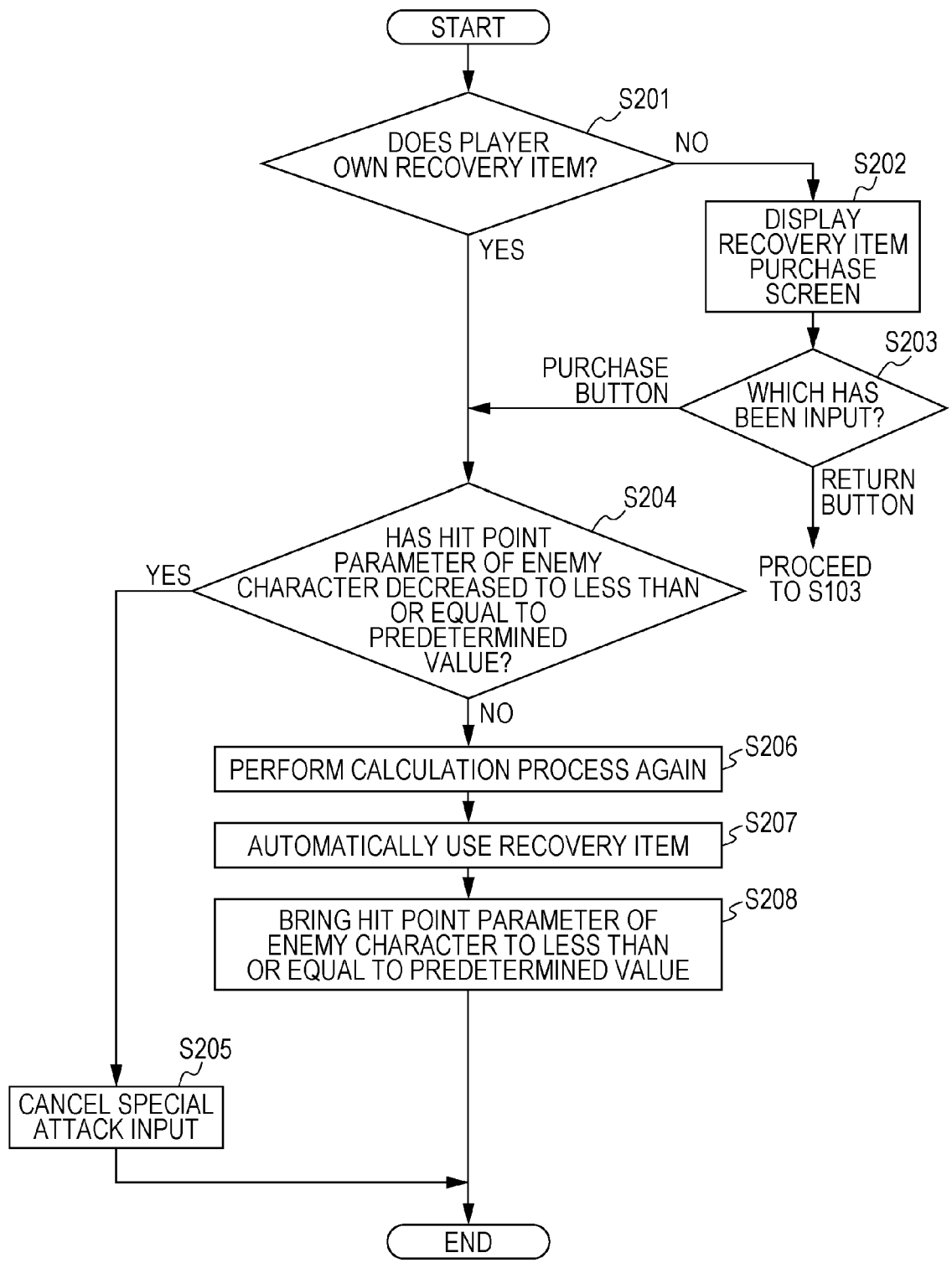
FIG. 13 is a flowchart illustrating a special battle process.

FIG. 13 is a flowchart illustrating the special battle process.

When the player has selected the operation button 54 to perform the special attack, the determination unit 115 of the server device 10 first refers to the owned recovery item information illustrated in FIG. 8 and determines whether or not the number of recovery items owned by the player is greater than or equal to the total number of recovery items calculated by the calculation unit 114 (S201).

When the determination is negated, the screen data generation unit 117 generates the screen data used to display, on the player terminal 20, the game screen provided for the player to purchase the recovery item in shortage, whereby the game screen is displayed on the player terminal 20 (S202). On the other hand, the process proceeds to step 204 when the determination is affirmative.

Figure 14:
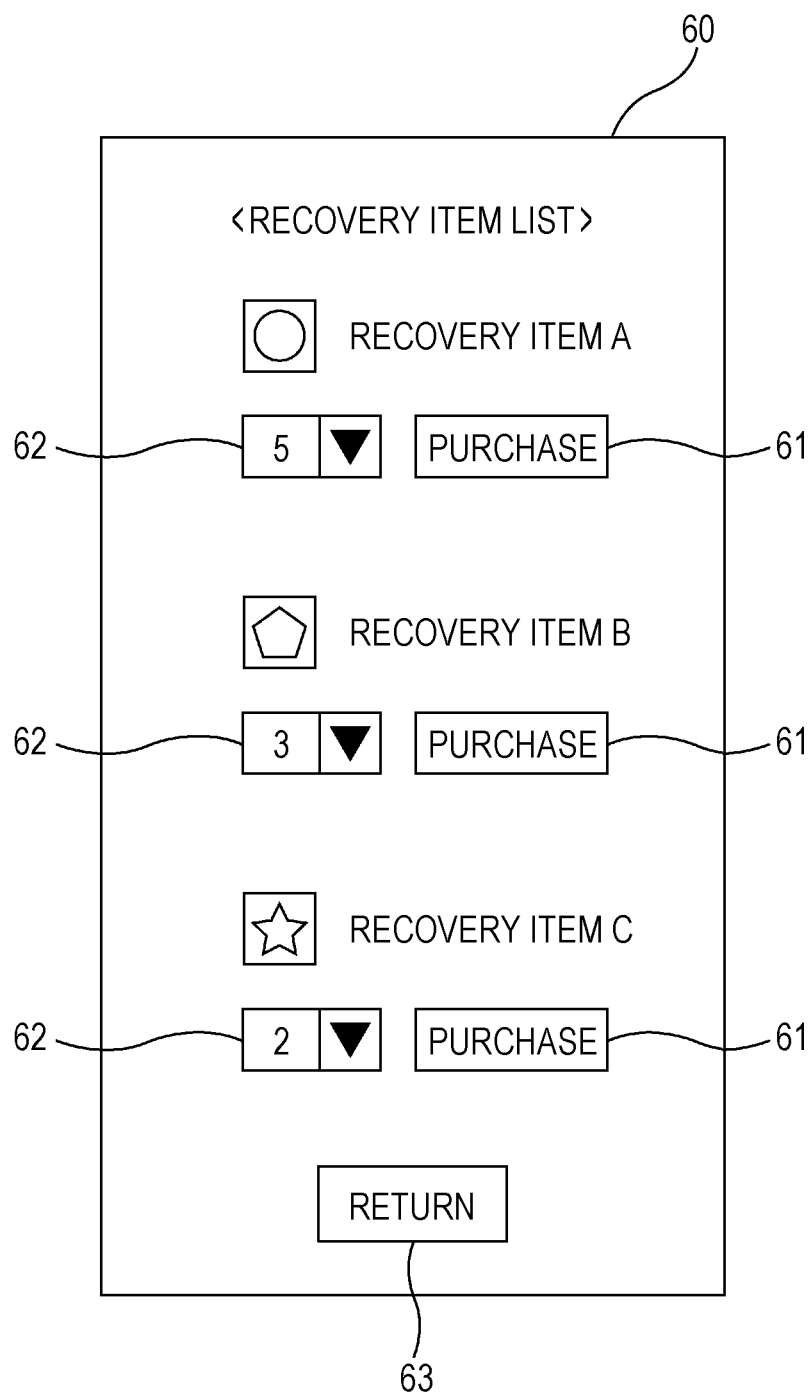
FIG. 14 is a diagram illustrating an example of a game screen provided to purchase a recovery item.

FIG. 14 is a diagram illustrating an example of the game screen from which the recovery item is purchased. A game screen 60 includes a purchase button 61, a menu button 62 to select the number of items to be purchased, a return button 63, a name and an image of a recovery item.

Referring back to FIG. 13, the determination unit 115 determines whether the purchase button 61 has been selected or the return button 63 has been selected on the game screen illustrated in FIG. 14 (S203). The process proceeds to step 204 when the player has selected the purchase button 61. The process goes back to step 103 when the return button 63 has been selected.

Subsequently, the determination unit 115 determines whether or not the hit point parameter of the enemy character has been decreased less than or equal to the predetermined value by referring to the enemy character information illustrated in FIG. 9 (S204). That is, the special attack by the player is canceled (S205) when the hit point parameter of the enemy character has already been decreased less than or equal to the predetermined value by an attack from another player (S204: YES). On the other hand, the calculation unit 114 performs the calculation process performed in step 102 once again (S206) when there has been no attack from another player or the hit point parameter of the enemy character has not been decreased less than or equal to the predetermined value by the attack from the other player (S204: NO).

Next, the special battle processing unit 116 automatically uses the total number of recovery items calculated by the calculation unit 114 from among the recovery items owned by the player (S207). The player information illustrated in FIG. 6 is updated at this time.

The special battle processing unit 116 then brings the hit point parameter of the enemy character to less than or equal to the predetermined value (S208). The enemy character information illustrated in FIG. 9 is updated at this time.

Figure 15:
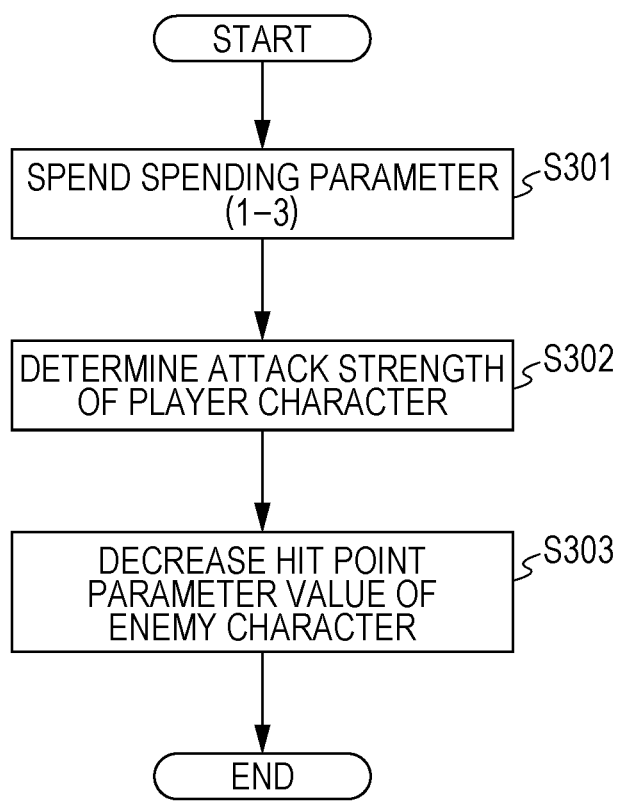
FIG. 15 is a flowchart illustrating a normal battle process.

FIG. 15 is a flowchart illustrating the normal battle process.

When any of the operation buttons 51, 52, and 53 to perform the normal attack has been selected by the player, the battle processing unit 113 of the server device 10 first spends 1, 2, or 3 points of the spending parameter according to the operation button 51, 52, or 53 selected (S301).

The battle processing unit 113 thereafter determines the attack strength of the player character (S302). The battle processing unit 113 increases the attack strength parameter of the player character 1.2-fold, threefold, or fivefold according to the operation button 51, 52, or 53 selected.

Next, the battle processing unit 113 does damage to the enemy character on the basis of the determined attack strength of the player character and decreases the hit point parameter of the enemy character (S303). Note that at this time, the battle processing unit 113 also does damage to the player character on the basis of the attack strength parameter of the enemy character and decreases the hit point parameter of the player character.

Referring back to FIG. 11, the win/loss of the battle against the enemy character is determined on the basis of the hit point parameter of the enemy character and the hit point parameter of the player character as a result of the normal battle process and the special battle process performed by the battle processing unit 113 and the special battle processing unit 116, respectively (S107). That is, it is determined that the player character has won when the hit point parameter of the enemy character has become "0" first and that the player character has lost when the hit point parameter of the player character has become "0" first.

When the player performs the operational input for one special attack in the game system 1 according to the present embodiment, as described above, the total number of recovery items calculated by the calculation unit 114 is automatically used from among the recovery items owned by the player and, at the same time, the hit point parameter of the enemy character becomes less than or equal to the predetermined value by fighting the battle not for the plurality of times but only once. As a result, the player can recover the spending parameter without taking time and shorten the battle time against the enemy character, as compared to when performing the operational input for the normal attack.

Operation Example 2

Figure 16:
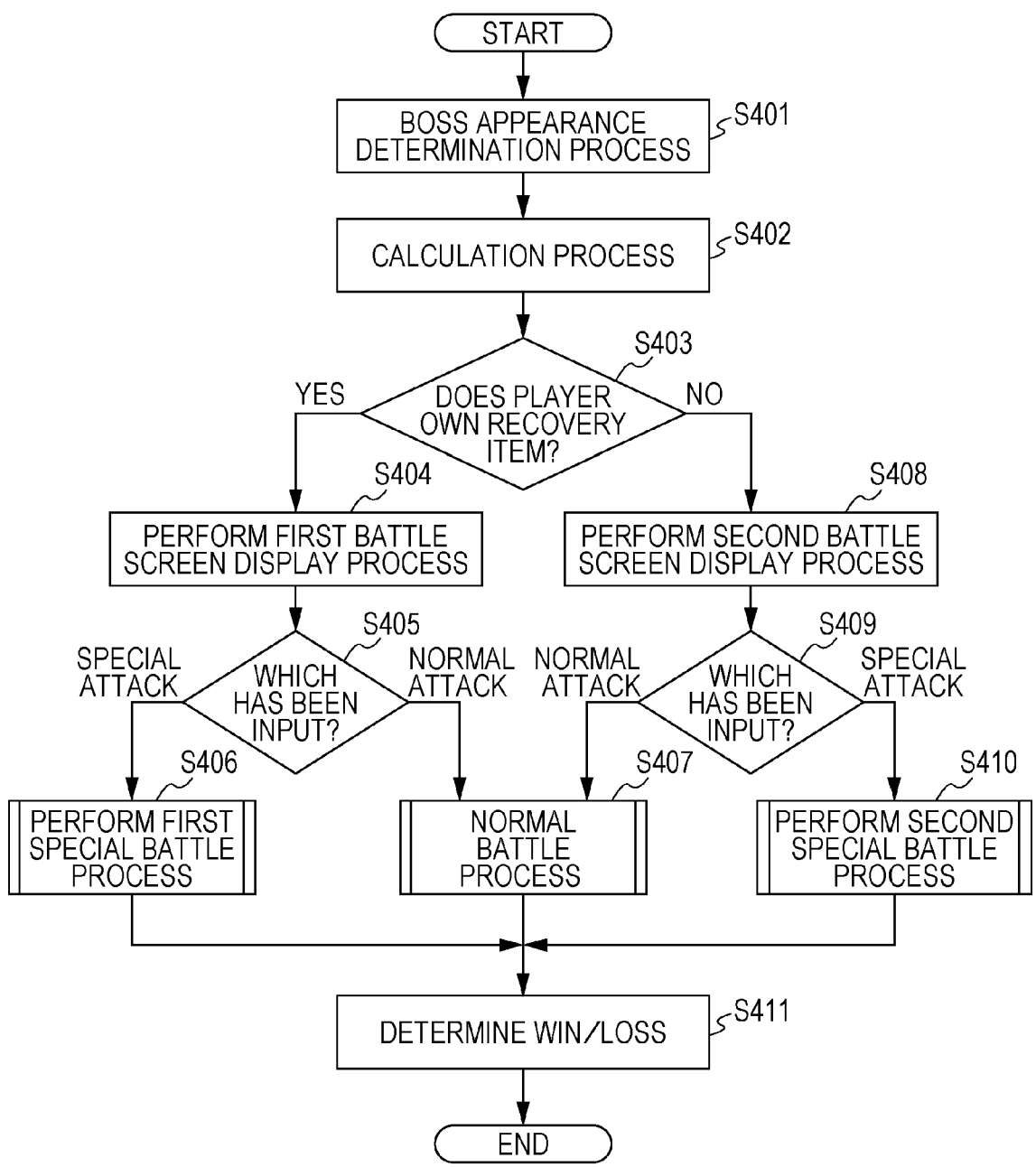
FIG. 16 is a flowchart illustrating another operation example of the game system.

FIG. 16 is a flowchart illustrating another operation example of the game system 1 according to the present embodiment.

Similar to operation example 1 illustrated in FIG. 11, a boss appearance determination process illustrated in step 101 is performed (S401), followed by a calculation process illustrated in step 102 (S402).

Next, the determination unit 115 refers to the owned recovery item information illustrated in FIG. 8 and determines whether or not the number of recovery items owned by the player is greater than or equal to the total number of recovery items calculated by the calculation unit 114 (S403).

Figure 17:
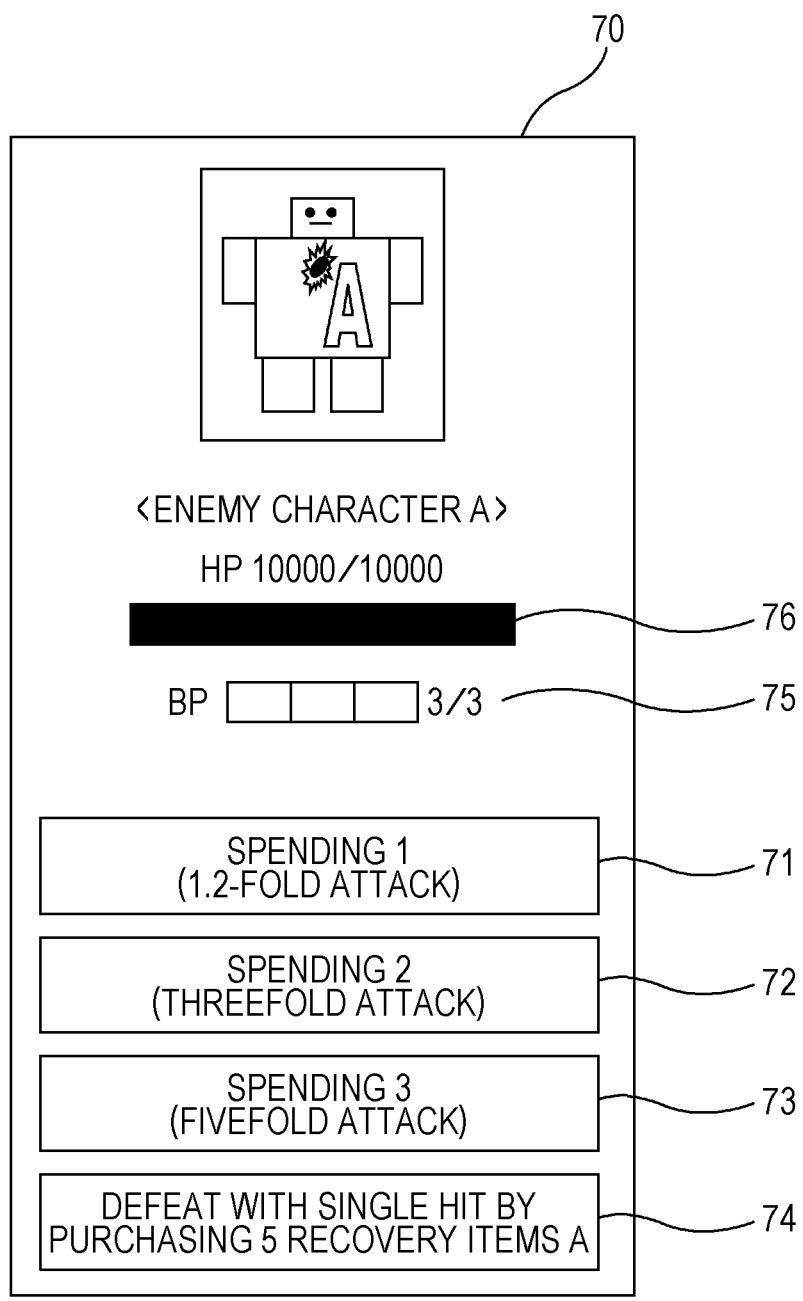
FIG. 17 is a diagram illustrating an example of a game screen on which the operational input for each of the normal attack and the special attack is performed.

A first battle screen display process of displaying the game screen illustrated in FIG. 12 on the player terminal 20 is performed when the determination is negated (S404), whereas a second battle screen display process of displaying the game screen illustrated in FIG. 17 on the player terminal 20 is performed when the determination is affirmative (S408).

Note that the description of the process performed after step 404 will be omitted since the process is similar to that in operation example 1 illustrated in FIG. 11, where a determination process illustrated in step 104 (S405), a special battle process illustrated in step 105 (S406), and a normal battle process illustrated in step 106 (S407) are performed.

FIG. 17 is a diagram illustrating an example of the game screen on which the operational input for the normal attack and the special attack is performed. A game screen 70 includes operation buttons 71, 72, and 73 used to perform the normal attack, an operation button 74 used to perform the special attack, a spending parameter display area 75, and a hit point parameter display area 76. The operation buttons 71, 72, and 73 are used to perform the normal attack by spending the spending parameter by 1, 2, and 3 points, respectively. The attack strength of the player character increases 1.2-fold, threefold, and fivefold when the player selects each of the operation buttons 71, 72, and 73, respectively. The operation button 74 is used to perform the special attack. When the player selects the operation button 74, the number of recovery items owned by the player becomes greater than or equal to the total number of recovery items calculated by the calculation unit 114 by automatically spending the amount of virtual currency equivalent to the value of the recovery item in shortage (here, it is assumed that the player owns ten recovery items and that the recovery items are short by five items in relation to the total number (15 pieces) of recovery items calculated by the calculation unit 114). Accordingly, the total number of recovery items calculated by the calculation unit 114 is automatically used from among the recovery items owned by the player, and the hit point parameter of the enemy character becomes "0" in one go. That is, the player can defeat the enemy character with one hit while replenishing the recovery item in shortage.

Referring back to FIG. 16, operation information is transmitted from the player terminal 20 to the server device 10 when the operation information related to the battle has been selected and input by the player in the aforementioned manner.

Next, the server device 10 performs a determination process on the basis of the operation information received from the player terminal 20 (S409). Specifically, the determination unit 115 determines whether the player has selected the operation buttons 71, 72, and 73 for the normal attack or the operation button 74 for the special attack. The second special battle process is executed when the operation button 74 to perform the special attack has been selected (S410), whereas the normal battle process is executed when the operation buttons 71, 72, and 73 to perform the normal attack have been selected (S407).

Figure 18:
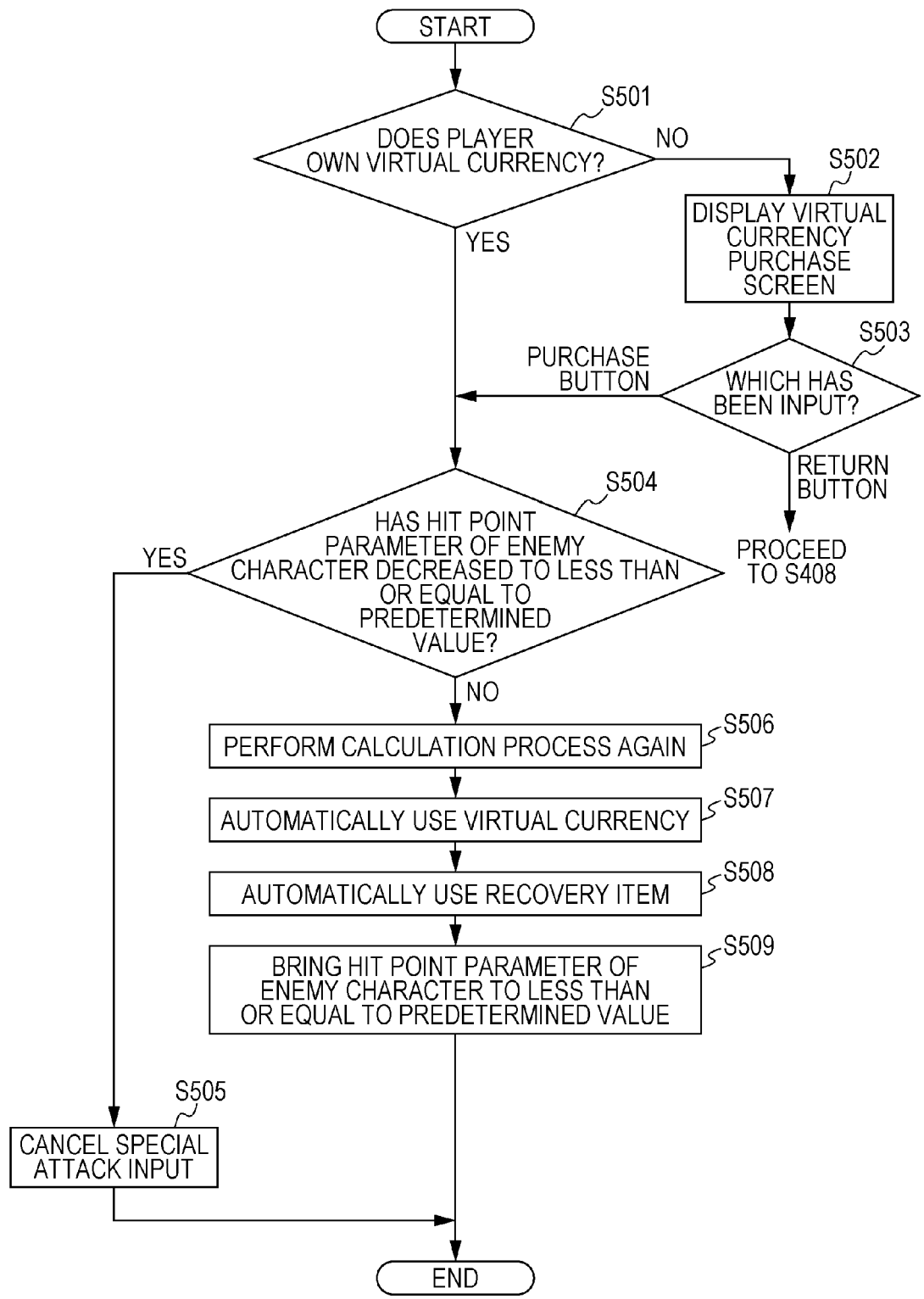
FIG. 18 is a flowchart illustrating a second special battle process.

FIG. 18 is a flowchart illustrating the second special battle process.

When the player has selected the operation button 74 to perform the special attack, the determination unit 115 of the server device 10 first refers to the player information illustrated in FIG. 6 and determines whether or not the amount of virtual currency owned by the player is greater than or equal to the amount corresponding to the value of the recovery item in shortage (S501).

When the determination is negated, the screen data generation unit 117 generates screen data used to display, on the player terminal 20, a game screen provided for the player to purchase the virtual currency in shortage, whereby the game screen is displayed on the player terminal 20 (S502). On the other hand, the process proceeds to step 504 when the determination is affirmative.

Next, the determination unit 115 determines whether the purchase button or the return button has been selected by the player (S503). The process proceeds to step 204 when the purchase button has been selected. The process goes back to step 408 when the return button has been selected.

Subsequently, the determination unit 115 determines whether or not the hit point parameter of the enemy character has been decreased less than or equal to the predetermined value by referring to the enemy character information illustrated in FIG. 9 (S504). That is, the special attack by the player is canceled (S505) when the hit point parameter of the enemy character has already been decreased less than or equal to the predetermined value by an attack from another player (S504: YES). On the other hand, the calculation unit 114 performs the calculation process performed in step 402 once again (S506) when there has been no attack from another player or the hit point parameter of the enemy character has not been decreased less than or equal to the predetermined value by the attack from the other player (S504: NO).

Next, the special battle processing unit 116 automatically spends the amount of virtual currency corresponding to the value of the recovery item in shortage (S507). The player information illustrated in FIG. 6 is updated at this time.

Then, the special battle processing unit 116 automatically uses the total number of recovery items calculated by the calculation unit 114 from among the recovery items owned by the player (S508). The player information illustrated in FIG. 6 is updated at this time.

The special battle processing unit 116 then brings the hit point parameter of the enemy character to less than or equal to the predetermined value (S509). The enemy character information illustrated in FIG. 9 is updated at this time.

Referring back to FIG. 16, the win/loss of the battle against the enemy character is determined on the basis of the hit point parameter of the enemy character and the hit point parameter of the player character as a result of the normal battle process and the special battle process performed by the battle processing unit 113 and the special battle processing unit 116, respectively (S411). That is, it is determined that the player character has won when the hit point parameter of the enemy character has become "0" first and that the player character has lost when the hit point parameter of the player character has become "0" first.

When the player performs the operational input for one special attack, in the game system 1 according to the present embodiment as described above, the amount of virtual currency corresponding to the value of the recovery item in shortage is automatically spent so that the number of recovery items owned by the player can be made greater than or equal to the total number of recovery items calculated by the calculation unit 114, even when the recovery item owned by the player is running short. Moreover, the total number of recovery items calculated by the calculation unit 114 is automatically used from among the recovery items owned by the player when the player performs the operational input for one special attack, and the hit point parameter of the enemy character is brought to less than or equal to the predetermined value by fighting one battle not for the plurality of times but only once. As a result, the player can recover the spending parameter without taking time and shorten the battle time against the enemy character, as compared to when performing the operational input for the normal attack.

Other Embodiments

The above-described embodiments have been given for easy understanding of the present invention, and are not used to construe the present invention in a limited manner. The present invention can be changed and improved without departing from the gist of the invention and includes its equivalents. Especially, embodiments described below are also included in the present invention.

<Special Battle Processing Unit 116>

The aforementioned present embodiments have described the case where the hit point parameter of the enemy character is brought down to "0" as an example in which the special battle processing unit 116 brings the hit point parameter of the enemy character to less than or equal to the predetermined value, but the present invention is not limited to such case. For example, the hit point parameter of the enemy character may be brought down to a numerical value other than "0".

Moreover, the aforementioned present embodiments have described the case where the recovery item is used with priority when the special battle processing unit 116 automatically uses the total number of recovery items calculated by the calculation unit 114 from among the recovery items owned by the player, but the present invention is not limited to such case. For example, the spending parameter may be spent with priority over the use of the recovery item when the spending parameter set to the player is remaining Specifically, when three points of the spending parameter corresponding to three recovery items are remaining where the total number of recovery items calculated by the calculation unit 114 equals 15 items, the spending parameter may first be spent by three points so that 12 recovery items are automatically used thereafter.

<Purchase of Recovery Item>

The aforementioned present embodiments have described the case where the game screen illustrated in FIG. 14 is displayed by the display process performed in step 202 when the determination is negated by the determination process performed in step 201 of the flowchart illustrated in FIG. 13, but the present invention is not limited to such case. The game screen illustrated in FIG. 17 may be displayed instead, for example. Upon performing the operational input for the special attack on the game screen illustrated in FIG. 17, the player can defeat the enemy character with a single hit while replenishing the recovery item in shortage.

<Calculation Unit 114>

The aforementioned present embodiments have described the case where, in the normal attack illustrated in FIG. 10, the damage done to the enemy character by the player character equals "2000" (the attack strength parameter "400"×"the fivefold attack strengths" with three points spent; refer to FIG. 12) when the total number of recovery items calculated by the calculation unit 114 equals 15 items, but the present invention is not limited to such case. For example, the damage done to the enemy character by the player character may be further multiplied by a random value. As a result, the damage done to the enemy character by the player character is not fixed to "2000" but may be "1900" or "2100" when multiplied by the random value. The player character can therefore cause a wide range of damage to the enemy character. Accordingly, the player performing the special attack can create a case where the hit point parameter of the enemy character cannot be brought to less than or equal to the predetermined value even when the 15 recovery items are automatically used or a case where the hit point parameter of the enemy character can be brought to less than or equal to the predetermined value by automatically using 14 recovery items.

<Server Device 10>

In the above-described present embodiments, the game system 1 provided with one server device 10 as an example of a server device has been exemplarily described. However, the game system 1 is not limited to this example, and may be provided with a plurality of server devices 10 as an example of the server device. That is, a plurality of server devices 10 is connected through a network 2, and each of the server devices 10 may perform various types of processing in a distributed manner.

<Information Processing Device>

In the above-described game system 1 in the present embodiments, a case has been exemplarily described, in which various types of processing are executed based on a game program by the server device 10 and the player terminal 20 in cooperation with each other. However, the game system 1 is not limited to the example. The above-described various types of processing may be executed by the player terminal 20 alone or by the server device 10 alone as an information processing device based on the game program.

Further, it may be configured such that the player terminal 20 bares a part of the functions as the information processing device. In this case, the server device 10 and the player terminal 20 constitute the information processing device.

Note that the information processing device is an example of a computer provided with a processor and a memory.

What is claimed is:

1. An information processing device executing a battle game in which a player character fights a battle against an enemy character, the information processing device comprising:

a storage unit which stores player information, player character information including an attack strength parameter of the player character, and enemy character information including a hit point parameter of the enemy character, the player information setting, to the player, a spending parameter spent every time a battle is fought as well as a number of game media owned that is used to recover the spending parameter;

a normal battle processing unit which changes the hit point parameter of the enemy character based on the attack strength parameter of the player character by executing a normal battle while spending the spending parameter set to the player in response to an operational input from the player, and recovers the spending parameter spent in the normal battle by using the game media owned by the player in response to a recovery operational input from the player;

a calculation unit which calculates the number of the game media used to recover the spending parameter when the normal battle is fought for a plurality of times until the hit point parameter of the enemy character is brought down to a predetermined value or less by the normal battle processing unit; and a special battle processing unit which uses, in response to a special operational input from the player, the number of the game media calculated by the calculation unit from among the game media owned by the player, and executes a special battle of bringing the hit point parameter of the enemy character down to the predetermined value or less by fighting the normal battle not for a plurality of times but only once.

2. A non-transitory computer-readable storage medium storing a game program which causes a computer to execute a battle game in which a player character fights a battle against an enemy character, the computer executing:

a storage process of storing, in a storage unit, player information, player character information including an attack strength parameter of the player character, and enemy character information including a hit point parameter of the enemy character, the player information setting, to the player, a spending parameter spent every time a battle is fought as well as the number of game media owned that is used to recover the spending parameter;

a normal battle process of changing the hit point parameter of the enemy character based on the attack strength parameter of the player character by executing a normal battle while spending the spending parameter set to the player in response to an operational input from the player, and recovering the spending parameter spent in the normal battle by using the game media owned by the player in response to a recovery operational input from the player;

a calculation process of calculating the number of the game media used to recover the spending parameter when the normal battle is fought for a plurality of times until the hit point parameter of the enemy character is brought down to a predetermined value or less in the normal battle process; and a special battle process of using, in response to a special operational input from the player, the number of the game media calculated in the calculation process from among the game media owned by the player, and executing a special battle of bringing the hit point parameter of the enemy character down to the predetermined value or less by fighting the normal battle not for a plurality of times but only once.

* * * * *